United States Patent
Woods

[11] Patent Number: 6,101,491
[45] Date of Patent: Aug. 8, 2000

[54] METHOD AND APPARATUS FOR DISTRIBUTED INDEXING AND RETRIEVAL

[75] Inventor: William A. Woods, Winchester, Mass.

[73] Assignee: Sun Microsystems, Inc., Palo Alto, Calif.

[21] Appl. No.: 08/829,655

[22] Filed: Mar. 31, 1997

Related U.S. Application Data

[63] Continuation-in-part of application No. 08/499,268, Jul. 7, 1995, Pat. No. 5,724,571.

[51] Int. Cl.⁷ .................................................. G06F 17/30
[52] U.S. Cl. ........................................ 707/3; 707/6; 707/2
[58] Field of Search .................................... 707/6, 3, 2

[56] References Cited

U.S. PATENT DOCUMENTS

| | | | |
|---|---|---|---|
| 4,839,853 | 6/1989 | Deerwester et al. | 395/605 |
| 4,849,898 | 7/1989 | Adi | 364/419.1 |
| 4,984,178 | 1/1991 | Hemphill et al. | 395/759 |
| 5,062,074 | 10/1991 | Kleinberger | 395/605 |
| 5,276,616 | 1/1994 | Kuga et al. | 364/419.08 |
| 5,301,109 | 4/1994 | Landauer et al. | 364/419.19 |
| 5,321,833 | 6/1994 | Chang et al. | 707/5 |
| 5,325,298 | 6/1994 | Gallant | 364/419.19 |
| 5,404,514 | 4/1995 | Kageneck et al. | 395/605 |
| 5,418,948 | 5/1995 | Turtle | 395/600 |
| 5,418,951 | 5/1995 | Damashek | 395/605 |
| 5,428,778 | 6/1995 | Brookes | 395/605 |
| 5,440,481 | 8/1995 | Kostoff et al. | 364/419.19 |
| 5,450,580 | 9/1995 | Takada | 395/600 |
| 5,475,588 | 12/1995 | Schabes et al. | 395/2.64 |
| 5,542,078 | 7/1996 | Martel et al. | 707/101 |
| 5,544,352 | 8/1996 | Egger | 395/600 |
| 5,619,709 | 4/1997 | Caid et al. | 707/9 |
| 5,659,732 | 8/1997 | Kirsch . | |
| 5,659,746 | 8/1997 | Bankert et al. | 707/9 |
| 5,675,819 | 10/1997 | Schuetze | 704/10 |
| 5,724,571 | 3/1998 | Woods | 707/5 |
| 5,740,425 | 4/1998 | Povlius | 707/100 |
| 5,806,065 | 9/1998 | Lomet | 707/8 |
| 5,832,182 | 11/1998 | Zhang et al. | 707/101 |
| 5,832,496 | 11/1998 | Anand et al. | 707/102 |
| 5,852,820 | 12/1998 | Burrows | 707/2 |

OTHER PUBLICATIONS

Chung, Kin–Man and Yuen, Herbert, "A 'Tiny' Pascal Compiler: the P–Code Interpreter," BYTE Publications, Inc., Sep. 1978.

Chung, Kin–Man and Yuen, Herbert, "A 'Tiny' Pascal Compiler: Part 2: The P–Compiler," BYTE Publications, Inc., Oct. 1978.

Thompson, Ken, "Regular Expression Search Algorithm," Communications of the ACM, vol. II, No. 6, p. 149 et seq., Jun. 1968.

Mitchell, James G., Maybury, William, and Sweet, Richard, Mesa Language Manual, Xerox Corporation.

McDaniel, Gene, "An Analysis of a Mesa Instruction Set," Xerox Corporation, May 1982.

Pier, Kenneth A., "A Retrospective on the Dorado, A High--Performance Personal Computer," Xerox Corporation, Aug. 1983.

(List continued on next page.)

Primary Examiner—Wayne Amsbury
Attorney, Agent, or Firm—Finnegan, Henderson, Farabow, Garrett & Dunner L.L.P.

[57] ABSTRACT

Systems and methods consistent with the present invention access information from databases having stored indexes of completed information corresponding to the databases by receiving a query identifying desired information; examining the concepts of information in the stored indexes to identify as hits the contents of the databases that match the query; determining, for each hit, a measure of a difference between the query and the conceptual information from the indexes; and combining the hits from the indexes in accordance with the determined measures.

63 Claims, 7 Drawing Sheets

OTHER PUBLICATIONS

Pier, Kenneth A., "A Retrospective on the Dorado, A High-Performance Personal Computer," IEEE Conference Proceedings, The 10th Annual international Symposium on Computer Architecture, 1983.

Eric Brill, "Some Advances in Transformation–Based Part of Speech Tagging," AAAI Conference, 1994.

Salton, G., et al., "Approaches to Passage Retrieval in Full Text Information Systems," Proceedings of the Sixteenth Annual International ACM SIGIR Conference on Research and Development in Information Retrieval (SIGIR 93), ACM Press, 1993, pp. 49–58.

Callan, J.P., "Passage–level Evidence in Document Retrieval," Proceedings of the Seventeenth Annual International ACM–SIGIR Conference on Research and Development in Information Retrieval (SIGIR 94), Springer–Verlag, 1994, pp. 302–310.

Wilkinson, R., "Effective Retrieval of Structured Documents," Proceedings of the Seventeenth Annual International ACM–SIGR Conference on Research and Development in Information Retrieval (SIGIR 94), Springer–Verlag, 1994, pp. 311–317.

Mittendorf, E. et al., "Document and Passage Retrieval Based on Hidden Markov Models," Proceedings of the Seventh Annual International ACM–SIGIR Conference on Research and Development in Information Retrival (SIGR 94), Springer–Verlag, 1994, pp. 318–327.

Woods, William A. and Schmolze, James G., "The KL–ONE Family," Harvard University Center for Research in computing Technology, Aiken Computation Laboratory, Cambridge, MA, Aug. 3, 1990, pp. 1–61.

Woods, William A., "Understanding Subsumption and Taxonomy: A Framework for Progress," Harvard University Center for Research in Comparing Technology, Aiken Computation Laboratory, Cambridge, MA, Aug. 15, 1990, pp. 1–61.

METHOD AND APPARATUS FOR DISTRIBUTED INDEXING AND RETRIEVAL

RELATED APPLICATIONS

This application is a continuation-in-part under 37 C.F.R. § 1.60 of U.S. patent application Ser. No. 08/499,268, for "Method and Apparatus for Generating Query Responses in a Computer-Based Document Retrieval System," filed Jul. 7, 1995, now U.S. Pat. No. 5,724,571, which is incorporated herein by reference.

This application is related to pending patent application Ser. No. 08/797,630, entitled, "Intelligent Network Browser Using Incremental Conceptual Indexer," filed Feb. 7, 1997, which is incorporated herein by reference. This application is also related to pending patent application Ser. No. 08/829,657, entitled, "Method and Apparatus for Cascaded Indexing and Retrieval," filed the same day as this application.

BACKGROUND OF THE INVENTION

1. Field of the Invention

The present invention relates to text retrieval systems and, more particularly, to a method for distributing indexes containing conceptual information derived from documents and responding to queries using those indexes. The present invention also relates to responding to queries using existing indexes of conventional document retrieval systems by reindexing documents identified by those systems in accordance conceptual information derived from those documents.

2. Description of the Related Art

The development of efficient and effective text retrieval techniques is critical to managing the increasing amount of textual information available in electronic form. Until recently, information retrieval involved relatively small collections of machine readable text in the range of 100 megabytes of data. Networks bring together collections of information in the gigabyte range, and the increased amount of data makes the retrieval process more difficult.

There are two main concerns facing text retrieval systems: (1) How to identify terms in documents that should be included in the index; and (2) After indexing the terms, how to determine that a document matches a query? Conventional text retrieval techniques rely on indexing keywords in documents. Index terms can be from single words, noun phrases, and subject identifiers derived from syntactic and semantic analysis. Conventional text retrieval systems for the World Wide Web, such as Yahoo!™ from Yahoo! Inc. and AltaVista™ from Digital Equipment Corporation, use these and other types of keyword indexing techniques to index documents available on the web. Unfortunately, a document's keywords alone rarely capture the document's true contents. Consequently, systems relying on keywords in an index to retrieve documents in response to queries often provide unsatisfactory retrieval performance.

Yahoo!, AltaVista, and other convention text retrieval systems for the web employ programs called "web crawlers" to traverse the web. Web crawlers follow links from page to page and extract terms from all the pages that they encounter. Each search engine then makes the resulting information accessible by providing lists of specific pages that match an input search request or query.

Because the web constantly changes as existing pages are modified and new pages are added, web crawlers cannot simply traverse the web and index it once. Instead, to stay current, they must repeatedly traverse the web to identify changes for refreshing the index. Changes are made constantly and without notice, however, so it is not possible to keep up with them.

Moreover, many sites on the web are now reluctant to provide the access demanded by web crawlers to access and index the sites pages because the resources given to the web crawler detract from those for the users. This poses another problem to the ongoing success of such retrieval techniques on the web.

"WAIS," which stands for Wide Area Information Servers, suggests one alternative to the use of web crawlers for indexing. WAIS is an architecture for a distributed information retrieval system based on the client server model of computation. WAIS allows users of computers to share information using a common computer-to-computer protocol. WAIS was originally designed and implemented by a development team at Thinking Machines, Inc. led by Brewster Kahle. WAIS requires the sites that publish information on the web to publish an index of that information as well. Search engines can then use the published indexes to respond to queries. Although WAIS helps the resource problem associated with web crawler-based text retrieval systems, it fails to address a more fundamental problem with conventional search and retrieval systems: the quality of the ranked output.

The quality of the output suffers from the way most searches occur. The most common methods for determining whether a document matches a query are the "boolean model" and the "statistical model." According to the boolean model, a match occurs when a document's index terms meet the boolean expression given by the user. The statistical model, on the other hand, is based on the similarity between statistical properties of the document and the query.

It is not unusual for conventional search engines using either approach to return a large number of matches for a simple query. When faced with a list of 20,000 hits in response to a query—not an uncommon experience when searching the web—a user cannot effectively review all the results. Whether the user accesses the matches serially or randomly, the review process takes an unwieldy amount of time to locate the documents of particular interest. Typically, Internet web searchers provide the user with the first 10 hits and continue to provide additional blocks of 10 until the user finds something acceptable or gives up. If the user has a simple information need and the answer shows up in the first 10 or 20 hits, then this is not unreasonable. However, if the user has serious research interest in the results, then it may be important to see the information available in the remaining hits.

Consequently, the criteria by which these hits are ranked becomes very important. More and more systems support some type of ranking feature because users have demanded easy-to-use query languages and ranking to sort out the most important information.

WAIS supports one document ranking scheme. WAIS scores documents based on the number of occurrences of a query term in a document, the location of the terms in a document, the frequency of those terms within the collection, and the size of the document. WAIS, however, uses a least-common-denominator standard that does not allow for sophisticated querying and ranking of results.

Moreover, most retrieval techniques provide ranked results with scoring methodologies that depend on statistics of the indexed collections. This means that the scores assigned to documents in different collections, even when using the same scoring methodology, are not commensurate and can not be used as an adequate basis for combining the ranked results from two separate searches. This poses a problem for distributing the indexing and retrieval processing among multiple processes or platforms.

At the same time, the growing volume of material for indexing has required search engine designers to focus on techniques for efficiency and volume processing, rather then on techniques for guaranteeing the best possible rankings. The conflict between these two objectives, accurate search results and indexing huge collections of information, poses a significant problem for the developers of the next generation of text retrieval systems.

SUMMARY OF THE INVENTION

Accordingly, systems and methods consistent with the present invention substantially obviate one or more of the problems due to limitations, shortcomings, and disadvantages of the related art by distributing the process of indexing documents using the conceptual indexing approach among multiple processes or platforms, applying queries to each index individually, and combining the results using penalty-based scores that include a measure of the difference between terms of the query and the conceptual terms found in the index. A method consistent with the present invention for accessing information from databases having stored indexes of completed information corresponding to the databases comprises the steps, performed by a processor, of: receiving a query identifying derived information; examining the concepts of information in the stored indexes to identify as hits the contents of the databases that match the query; determining, for each hit, a measure of a difference between the query and the conceptual information from the indexes; and combining the hits from the indexes in accordance with the determined measures.

Both the foregoing general description and the following detailed description are exemplary and explanatory only, and merely provide further explanation of the claimed invention.

BRIEF DESCRIPTION OF THE DRAWINGS

The accompanying drawings, which are incorporated in and constitute a part of this specification, illustrate systems and methods consistent with the invention and, together with the description, explain the advantages and principles of the invention. In the drawings.

DETAILED DESCRIPTION

Reference will now be made in detail to a system and method consistent with the present invention. Wherever possible, the same reference numbers will be used throughout the drawings and the following description to refer to the same or like parts.

Overview

Conceptual indexing refers to extracting conceptual phrases from the source material, assimilating them into a hierarchically-organized, conceptual taxonomy, and indexing those concepts in addition to indexing the individual words of the source text. Dynamic passage retrieval refers to a technique for using the positional information about where words and concepts occur in text to locate specific passages of material within the text that are responsive to a query.

Systems consistent with the present invention assist users in retrieving specific documents from among a large collection of documents, such as web pages, using conceptual indexing and penalty-based, relaxation-ranking retrieval. To distribute the work of constructing and maintaining conceptual indexes, the indexes themselves are distributed among multiple processes or platforms typically located close to where the indexed information resides. The processes may be located on a single machine or on multiple platforms in one or more networks. Thus, the bulk of the maintenance of the indexes is done by the information providers rather than by centralized text retrieval systems. This eliminates the need for sites to provide service for repeated requests by programs such as web crawlers that traverse their pages to see if anything has changed. Rather, the sites perform their own indexing and provide a service to retrieval requests.

In this scheme, the sites employ a "push" model rather than a "pull" model for indexing. Rather than waiting for central indexers to pull that information from the site by repeated polling, the sites know when a page has changed and incrementally update their local index. Central to this architecture is an attribute of the dynamic passage retrieval algorithm that enables result lists from independent searches to be easily combined. Because the penalty scores assigned to passages by the relaxation-ranking algorithm are independent of collection size or statistics, the results of queries to different sites can be collated together and pruned on the basis of their penalty scores, without risk of losing more important information in favor of less important information.

Dynamic passage retrieval makes it possible for the information seeker to access the content of the retrieved documents conceptually to find specific items of information quickly. In this way, dynamic passage retrieval complements document retrieval technology rather than competing with it. This complementary relationship allows one to choose to index a large body of material using conventional techniques, either for legacy or compatibility reasons, or to obtain more compact indexes by, for example, omitting positional information associated with word matches.

Nevertheless, one can obtain the benefits of conceptual indexing and dynamic passage retrieval for the end user by reindexing the results of a traditional search using cascaded indexing. Systems consistent with the present invention assist users in retrieving specific documents from a large collection of documents using cascaded indexing. Cascaded indexing makes a two-stage process consisting of a traditional search using conventional text retrieval systems in high recall mode followed by a conceptual index of the result. T his can be done as a way to provide more useful information access to an end user of a conventional retrieval system, or as a way to integrate conventional indexes into distributed indexing and retrieval. When a search of the World-Wide Web produces a results list with 20,000 matches, a conceptual index of the documents corresponding to the resulting hits makes it possible for the user to mine such an abundance of potentially relevant information effectively.

Distributed Indexing and Retrieval

System Configuration

Figure 1:
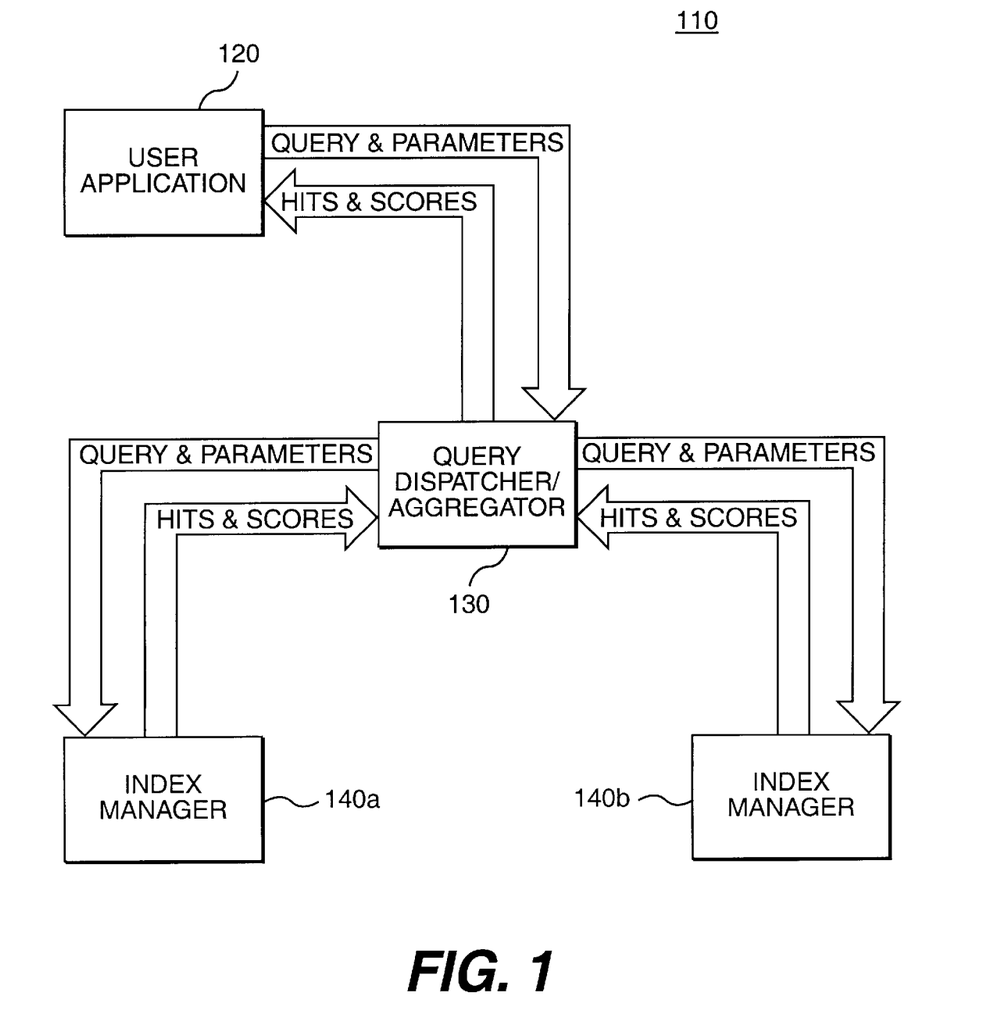
FIG. 1 is a block diagram of a distributed text retrieval system consistent with the present invention.

FIG. 1 illustrates the components of a distributed indexing and retrieval system 110 consistent with the present invention. System 110 includes a user application 120, a query dispatcher/aggregator 130, and multiple index managers 140a and 140b. Although system 110 in FIG. 1 includes two index managers, more than two may be used to take full advantage of the principles of the present invention.

System 10 resides either in a single platform, such as a personal computer, workstation, or mainframe, or in a network, such as the Internet or an Intranet. System 10 may also be partitioned among multiple processes or platforms. For example, user application 120 may reside on a platform different from the platforms for query dispatcher/aggregator 130 and index manager 140.

Exemplary platforms for all or part of system 110 include IBM compatible machines with Windows 95® operating system, or conventional workstations, and the Sparcstation® manufactured by Sun Microsystems Corp. and the Solaris® operating system. In the case of a single platform, index managers 140 may be distributed among multiple processes in the platform. On the other hand, the index managers are typically distributed among multiple platforms in the network scenario. Each index manager 140 manages a conceptual index of content information such as web pages. The content may reside on the same platform with the index manager or the content may be located on remote platforms.

Thus, the content or material to be indexed is generally partitioned into separate domains, each managed by an index manager (140a or 140b). Index manager 140a or 140b is either specially configured to include functionality like that described below with reference to FIGS. 2–4, or configured to include functionality to integrate the system with legacy document retrieval systems like Yahoo! and AltaVista (see FIGS. 4, 6–7). Alternatively, an index manager itself can be configured as a query dispatcher/aggregator, integrating other index managers in a manner similar to way query dispatcher/aggregator 130 integrates index managers 140 in FIG. 1.

User application 120, for example, a web browser such as Netscape or Internet Explorer, receives user queries, including a term or combination of terms, and a set of parameters, and passes them to dispatcher/aggregator 130. This process uses a protocol for communicating queries and results between user application 120 and query dispatcher/aggregator 130, for example, the TCP/IP protocol used in the Internet. User application 120 receives the query terms from the user and the parameters from predetermined tables that may be modified by user preferences, and sends the query and parameters to query dispatcher/aggregator 130. (In an alternative configuration, the server upon which query dispatcher/aggregator 130 resides, provides user application 120 with a web page to enter the query and search parameters. After the user enters this data, user application 120 sends it to query dispatcher/aggregator 130 using the TCP/IP protocol.)

The parameters assist in the process of selecting and scoring hits. One typical parameter specifies the maximum number of hits desired (i.e., a hit limit parameter). Alternatively, query dispatcher/aggregator 130 uses a predetermined hit limit. Other parameters set criteria used in identifying hits from the conceptual index and determining penalty scores for the hits in accordance with user preferences. For example, a parameter may govern the value of a penalty score for things like missing terms from the hit.

Query dispatcher/aggregator 130 passes the query to index managers 140a and 140b, and collects and aggregates the results, including hits and corresponding scores. The hits are either identifiers for documents or passages within the documents, the documents themselves, or the passages within the documents that most closely match the input query. The scores are generated using the penalty-based algorithm that assigns a score based on a measure of the difference between a passage in the document and the query.

Query dispatcher/aggregator 130 collects the hits from index managers 140a and 140b in accordance with a specified hit limit parameter and returns scored hits together with their penalty scores to user application 120. Query dispatcher/aggregator 130 also uses the penalty scores assigned to the hits by the individual index managers 140a and 140b to collate the results into a merged list in increasing order of penalty, preferably eliminating duplicates if they are encountered. The hits with the highest penalty scores are pruned, if necessary, to reduce the resulting aggregated list to the maximum number of hits requested.

Asynchronously, and independently from the query processing, index managers 140a and 140b for the different partitions update their indexes according to the policies of their host sites, for example, web servers holding the content from which the index is built. Host site policies are based, for example, on a calender-driven process such as processing the index overnight or on a push model in which the index is updated whenever a site specific application notifies it of a page that needs to be indexed or reindexed. Thus, index managers 140 update the indexes dynamically and in real time, so they remain as current as the publishing host site chooses.

Index Manager

Figure 2:
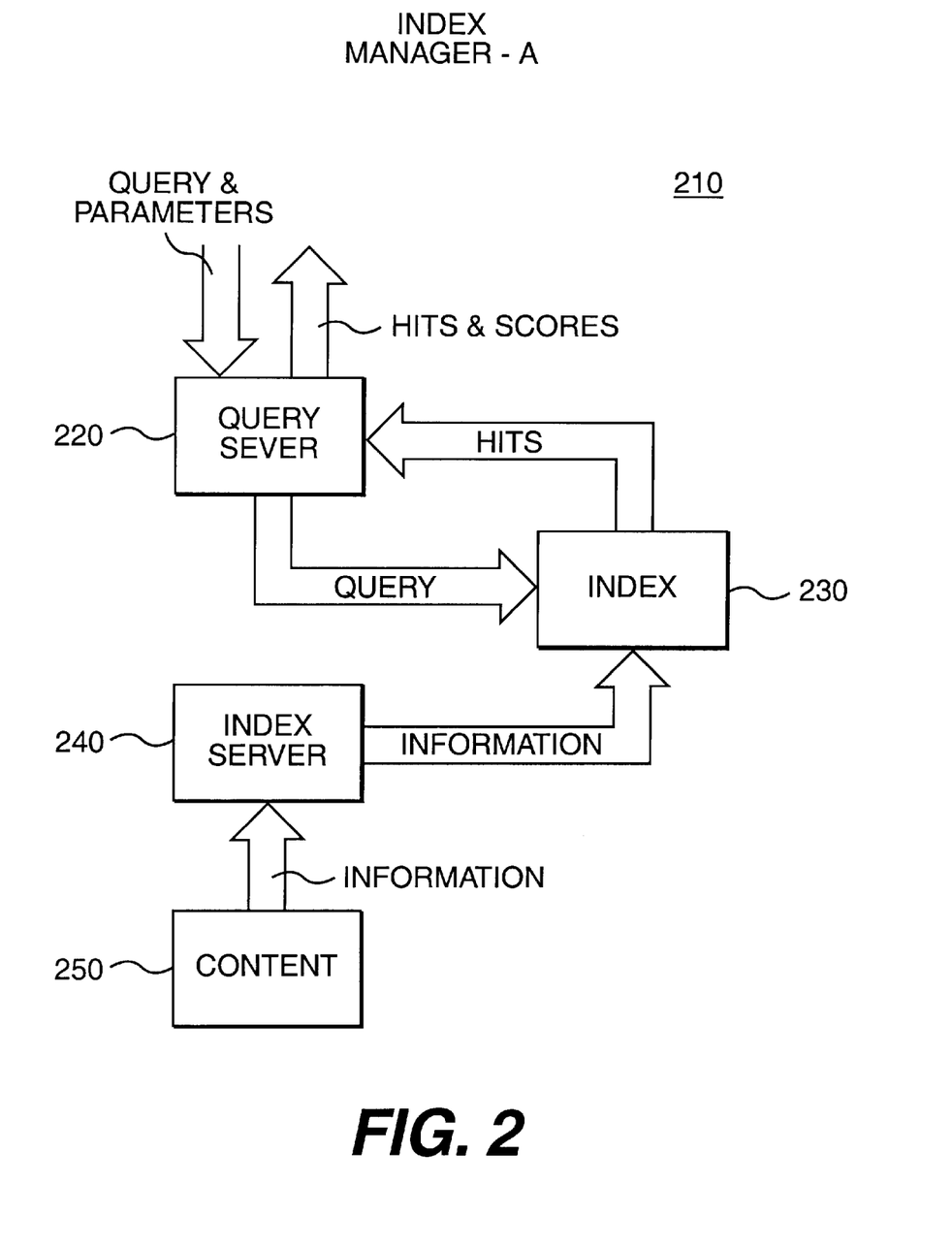
FIG. 2 is a block diagram of one configuration of an index manager of the distributed text retrieval system consistent with the present invention.

FIG. 2 is a block diagram of one configuration of an index manager 210, which can be index managers 140a, 140b. Index manager 210 is specially configured for distributed indexing and retrieval in a manner consistent with the present invention. Specifically, index manager 210 maintains a conceptual index 230 built using the conceptual indexing methodology described below.

Index manager 210 has two main functions: (1) building or modifying index 230, and (2) responding to queries from dispatcher/aggregator 130. These functions are performed by index server 240 and query server 220, respectively.

Index server 240 monitors content 250 for changes. Web page content changes as the proprietors of their web servers modify the existing pages, add new pages, or delete pages. Other examples of content include documents managed by an document processing systems, such as word processors and publishing systems, and databases of database management systems. According to the push model, the servers responsible for the content notify index server 240 of changes. Index server 240 then updates index 230 accordingly.

Query server 220 processes incoming document retrieval requests from query dispatcher/aggregator 130. Each request includes a query with parameters. If query dispatcher/aggregator 130 does not provide a hit limit parameter, query server 220 uses its own predetermined hit limit when processing requests. The predetermined hit limit may simply be the number of the hits, the number of the hits with penalty scores that do not exceed a particular value, or all hits regardless of the penalty scores, provided there is some correspondence between the query and the document or passage (e.g., paragraph or relevant section) within the document.

Query server 220 accesses conceptual index 230 to identify matches for the query, i.e., hits, and assigns scores to the hits in accordance with the penalty-based scoring algorithm. Query server 220 then returns the hits and scores to query dispatcher/aggregator 130 in accordance with the hit limit. Process Index Server FIG. 3 includes flow charts of two functions of index server 240 that keep it current, building/modifying and monitoring index 230. The process of building index 230 includes two steps. First, index server 240 receives information from publishers such as web servers on the Internet (step 310). Index server 240 then modifies conceptual index 230 (step 320).

The taxonomic methodology used in conceptual indexing, which provides a solution to the problems of keyword indexing, is discussed in W. Woods and J. Schmolze, "The KL-ONE Family," Harvard University, Aiken Computation Laboratory, Aug. 3, 1990, and W. Woods, "Understanding Subsumption and Taxonomy: A Framework for Progress," Harvard University, Aiken Computation Laboratory, Aug. 15, 1990.

In general, conceptual indexing involves techniques for automatically organizing all of the words and phrases of material into a conceptual taxonomy that explicitly links each concept to its most specific generalizations. The taxonomy is a graph structure that orders concepts by generality using ISA ("is a") links. For example, the following taxonomy represents the relationship between the concepts "computer" and "laptop":

computer
|--laptop.

In this representation, the "computer" concept is a more general form of the "laptop" concept. Thus, the "computer" concept is depicted as a parent of the "laptop" concept in the graph structure. The taxonomy can be used alone to organize information for browsing, or it can be used as an adjunct to search and retrieval techniques to construct improve query results.

Conceptual indexing of text preferably involves four steps: (1) heuristic identification of phrases in the text, (2) mapping these phrases into internal conceptual structures, (3) classifying the structures into a taxonomy, and (4) linking the concept to the location of the phrase in the text. As concepts are assimilated into the conceptual taxonomy during indexing, a broad coverage English lexicon is consulted to determine semantic relationships to other concepts based on recorded knowledge about the meanings of words. If any of the words of an indexed phrase do not yet have conceptual counterparts in the evolving taxonomy, they are assimilated into the taxonomy using information from the lexicon. The taxonomy does not contain all of the information from the lexicon, but only the information for words and concepts extracted from the indexed text or from other phrases assimilated into the taxonomy.

In addition to conceptual information extracted from the content of documents, index 230 also contains identifiers for the documents or passages within the documents corresponding to the indexed conceptual information.

Three types of subsumption relationships in the taxonomy include: (1) asserted subsumption relationships, (2) structural subsumption relationships, and (3) combination of subsumption and structural relationships. The asserted subsumption relationships come from only information in the lexicon. This means that the lexicon provides the foundational relationships for determining the taxonomic relationship between concepts.

Structural relationships are derived from the structure of phrases in the text being indexed. If the lexicon does not have information required to determine where a concept belongs in the taxonomy, the concept is placed in the taxonomy in accordance with structural relationships to other concepts already in the taxonomy. In general, a concept's place in the taxonomy can be based on both structural and subsumption relationships.

The taxonomy can be used as an aid in both formulating and processing queries. In querying the index, terms are treated as concepts and are expanded by their specific children in the taxonomy. Likewise, the taxonomy places limitations on the range of concepts that may correspond to query terms. For additional information and examples of conceptual indexing, see U.S. patent application Ser. No. 08/797,630, entitled, "Intelligent Network Browser Using Incremental Conceptual Indexer," filed Feb. 7, 1997.

Figure 3:
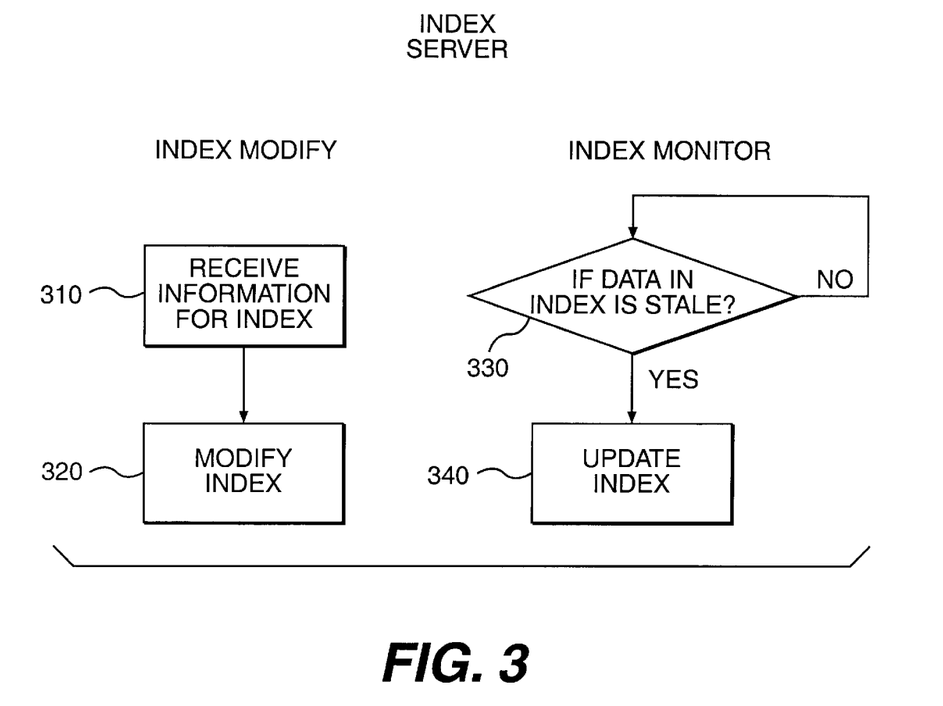
FIG. 3 is a flow chart of the steps performed by an index server for index modify and monitor functions consistent with the present invention.

Index server 240 also monitors index 230 to determine whether any information in it is stale (step 330). This determination may be based on a notification from the publisher that the information is old. Alternatively, when modifying index information (step 320), index server 240 may assign an indicator, such as a date, to the information in index 230. Index server 240 may then use the indicator to determine whether information in index 230 is stale. When index server 240 identifies stale information in index 230 (step 330), index server 240 updates index 230 accordingly (step 240), for example, by deleting stale information.

Query Server

Figure 4:
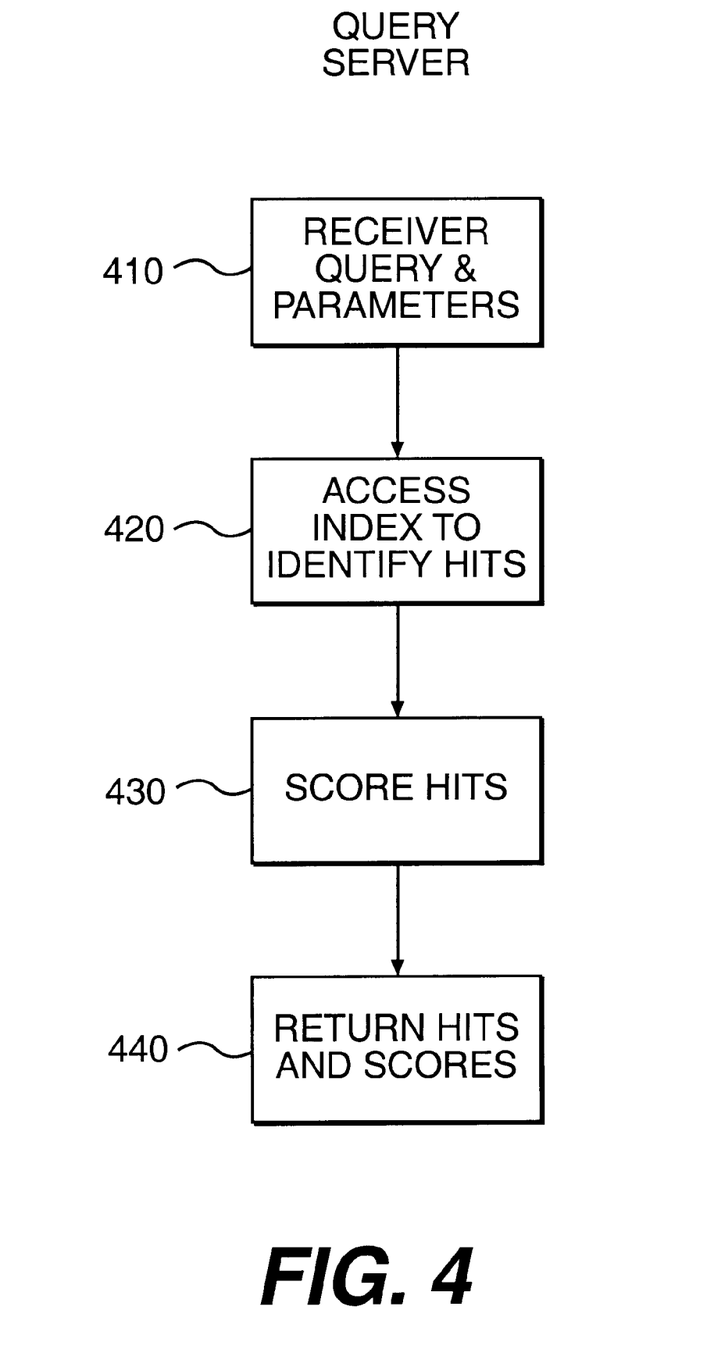
FIG. 4 is a flow chart of the steps performed by a query server consistent with the present invention.

FIG. 4 is a flow chart of the steps performed by query server 220. First, query server 220 receives a query and parameters from query dispatcher/aggregator 130 (step 410). The hit limit parameter may be one set by user application 120 who submitted the query, by query dispatcher/aggregator 130, or by query server 220.

Query server 220 then accesses index 230 to identify documents or passages in documents corresponding to conceptual information in index 230 that most closely correspond to the query (step 420). Query server 220 scores these hits using a scoring algorithm that scores passages by measuring how much they depart (in any of several dimensions) from an ideal passage, i.e., an exact replica of the query (step 430). The measure is referred to as relaxation ranking. In contrast with traditional retrieval ranking methods, where scores of results are based on accruing weights corresponding to pieces of evidence that a given result is relevant to a query, the scores assigned by the relaxation-ranking algorithm are based on accruing penalties for various kinds of departure from the ideal. Thus, the best passage is the one with the lowest score, as opposed to the highest score used by customary approaches. This approach is referred to as penalty-based scoring.

In addition to providing high-quality rankings, penalty-based scores have the additional attractive property that the values of the scores themselves are meaningful and interpretable. Thus, a user looking at a score can determine whether a match is likely to be good or not and can estimate how good it is likely to be. For example, zero (0) is a perfect score and many retrieved results will achieve this score. In contrast, scores assigned by traditional methods are only relatively comparable, and then only when derived from the same collection. Even in the case of probabilistic retrieval, where the scores are estimates of probabilities of relevance, and therefore should be somewhat interpretable, the individual probability scores are relative to the statistics of the collection and not individually meaningful. The probability of one (1) is virtually never reached, and there is no a priori probability that corresponds to a definitely relevant match. The aforementioned patent application, Ser. No. 08/499,268, for "Method and Apparatus for Generating Query Responses in a Computer-Based Document Retrieval System," describes penalty-based scoring in greater detail.

Because the penalty-based scores are individually meaningful according to criteria that do not depend on the material being indexed, two different result lists from different collections can be collated together on the basis of their penalty scores without the problems faced by other scoring methods used in information retrieval. This makes it possible to subdivide material to be indexed and distribute the work of indexing and search, since the results can easily be combined.

Returning to FIG. 4, query server 220 returns the hits and corresponding scores to query dispatcher/aggregator 130 (step 440).

Query Dispatcher/Aggregator

Figure 5:
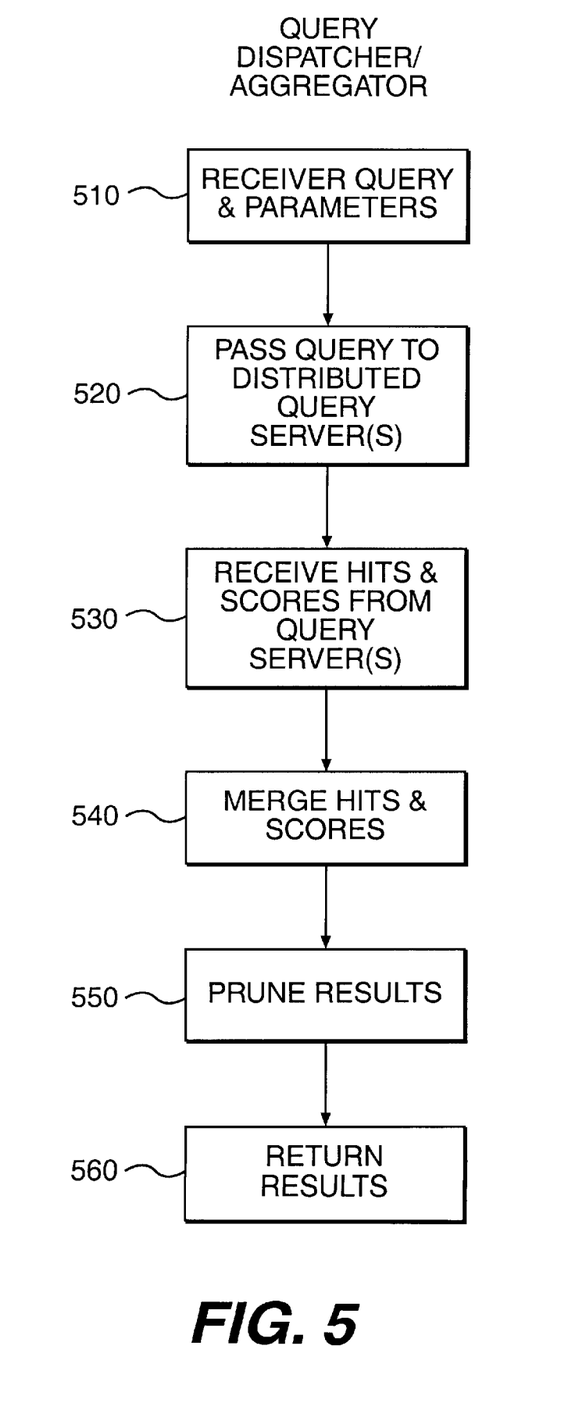
FIG. 5 is a flow chart of the steps performed by a query dispatcher/aggregator of the distributed text retrieval system consistent with the present invention.

FIG. 5 is a flow chart of the steps performed by query dispatcher/aggregator 130. First, query dispatcher/aggregator 130 receives a query and parameters from, for example, user application 120 (step 510). Query dispatcher/aggregator 130 then passes the query to each of the distributed index managers 140 and, particularly, the query server 230 of each index manager 140 (step 520). After each query server 230 processes the query using the associated conceptual index 230, query dispatcher/aggregator 130 receives the hits and scores (step 530). Query dispatcher/aggregator 130 then merges the hits and scores from the various index managers 140 (step 540) and prunes the results to, for example, eliminate duplicates or hits with scores above a threshold value (step 550). Finally, query dispatcher/aggregator 130 returns the results, including the hits and scores to user application 120 (step 560).

Cascaded Indexing and Retrieval

Cascaded indexing and retrieval involves the dynamic construction of a conceptual index of information identified by the results of a conventional text retrieval system such as Yahoo! and AltaVista. In order to provide for material that is already indexed by some other methodology that does not provide commensurate penalty-based scores, for example, the methodology used by AltaVista a reindexer takes the results of the conventional search and reindexes the documents, such as web pages, using the relaxation ranking method of the dynamic passage retrieval algorithm. The reindexer then provides the results of this reindexing process to the query dispatcher/aggregator. The reindexer interacts with the conventional index server of AltaVista, passing the query to that server. The reindexer then indexes the contents of the documents identified by the server in response to the query.

Figure 6:
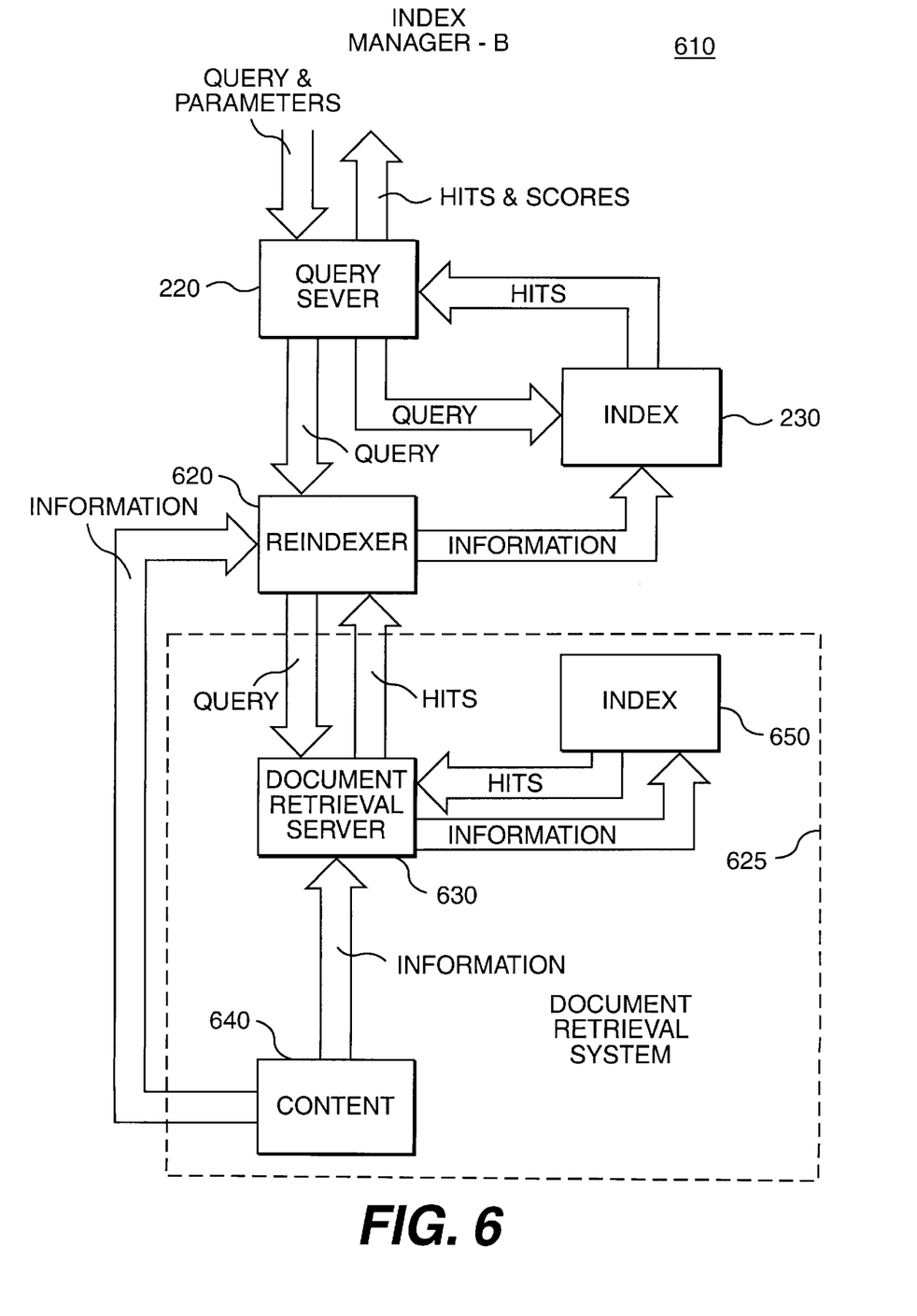
FIG. 6 is a block diagram of another configuration of the index manager of the distributed text retrieval system consistent with the present invention.

FIG. 6 illustrates the components of an index manager 610 consistent with the present invention for implementing cascaded indexing and retrieval. Index manager 610 consists of query server 220, index 230, and a reindexer 620. Index manager 610 is designed to complement a conventional document retrieval system 625, which consists of a document retrieval server 630 and an index 650 of content 640, such as web pages. In the Internet, users send queries to document retrieval system 625 using the TCP/IP protocol, and system 625 in turn accesses index 650 to identify specific web pages that satisfy the terms of each query according to predetermined criteria set by system 625.

To implement cascaded indexing in a manner consistent with the present invention, query server 220 provides the user's query to reindexer 620. Reindexer 620 formats the query for system 630 and transmits the reformatted query to server 630. Server 630 provides the query results to reindexer 620, which accesses the content identified in the hits and reindexes the content into conceptual index 230. Query server 220 then processes the query on index 230 in the manner discussed above, and returns the hits and scores to user application 120.

Process

Cascaded indexing uses the query server processing discussed above with reference to FIG. 4, with the additional step of providing the query to reindexer 620 before accessing index 230 to process the input query.

Reindexer

Figure 7:
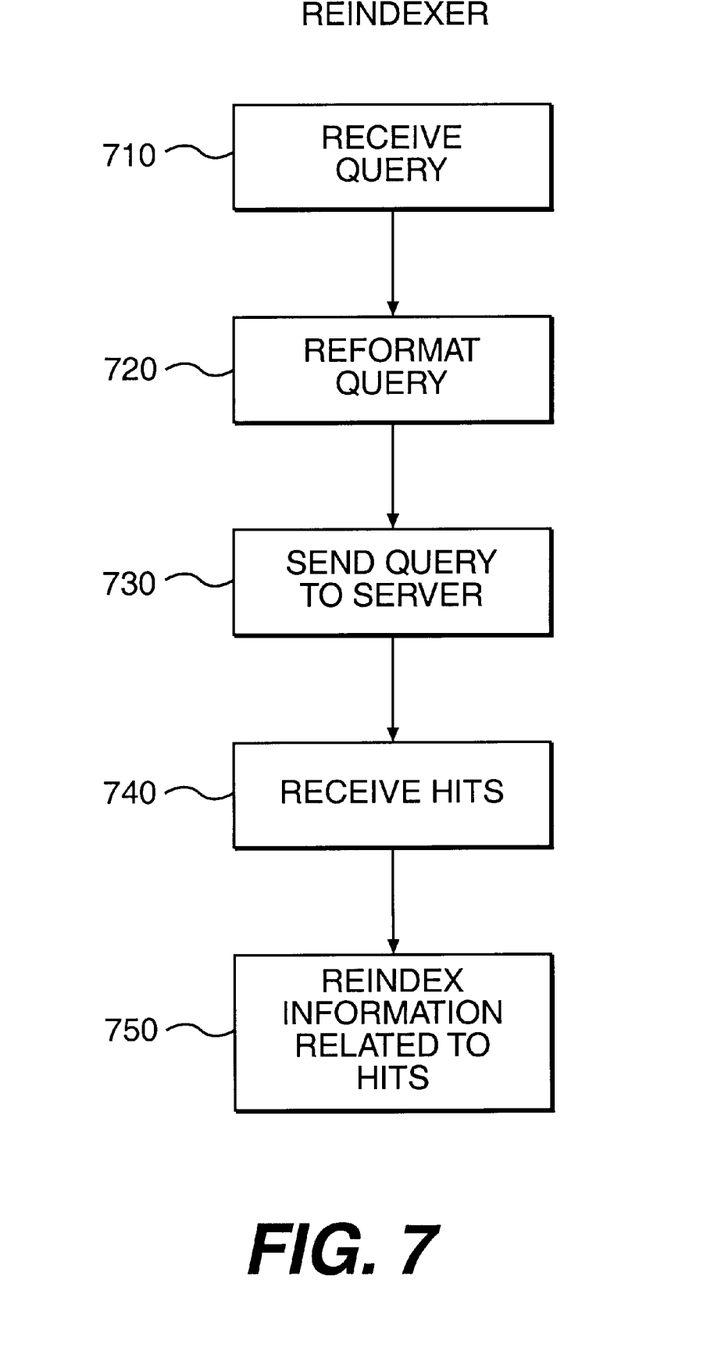
FIG. 7 is a flow chart of the steps of a reindexer of the index manager of FIG. 6.

FIG. 7 is a flow chart of the steps performed by reindexer 620. First, reindexer 620 receives the query from query server 220 (step 710), reformats the query for document retrieval system 625 (step 720), and then sends the reformatted query to server 630 (step 730). After reindexer 620 sends the query, it receives the hits of document retrieval system 625 (step 740). Reindexer 620 reindexes the documents related to the hits identified by system 625 into index 230 (step 750).

Conclusion

To overcome the shortcomings of conventional text retrieval systems, systems consistent with the present invention can retrieve specific documents from a large collection of documents using conceptual indexing and penalty-based, relaxation-ranking retrieval. This combination enables the system to distribute the conceptual index among a plurality of process or platforms. Conceptual indexing and penalty-based, relaxation-ranking also enhances text retrieval of conventional systems through cascaded indexing.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The scope of the invention is defined by the claims and their equivalents.

What is claimed is:

1. A method for accessing information from databases having stored indexes of conceptual information corresponding to the databases comprising the steps, performed by a processor, of:

receiving a query identifying desired information;

distributing the query to the indexes;

examining the concepts of information in the stored indexes to identify as hits the contents of the databases that match the query;

determining, for each hit, a measure of a difference between the query and the conceptual information from the indexes; and combining the hits from the indexes in accordance with the determined measures.

2. The method of claim 1, wherein the combining step includes the substep of:

ranking the hits in accordance with the measure for each hit, the hits with lower measures indicating a better correspondence between the represented conceptual information and the query than the hits with higher measures.

3. The method of claim 1, wherein the receiving step includes the substep of:

receiving a hit limit indicating a maximum number of hits.

4. The method of claim 3, wherein the combining step includes the substep of:

pruning the hits in accordance with the hit limit.

5. The method of claim 1, wherein the examining step includes the substep of:

accessing in the indexes a stored taxonomy of concepts and relationships between the concepts.

6. The method of claim 5, wherein the accessing step includes the substep of:

identifying concepts from the stored taxonomy that correspond to the query.

7. The method of claim 5, wherein the accessing step includes the substep of:

identifying concepts from the stored taxonomy that correspond to the query based on the relationships among the concepts in the taxonomy.

8. The method of claim 1 wherein the combining steps includes the substep of:

pruning the hits in accordance with a predetermined hit limit.

9. The method of claim 1, further comprising the step of:

returning the conceptual information corresponding to each hit with its difference measure.

10. The method of claim 1, wherein the indexes identify documents in the databases, and wherein the method further comprises the step of:

presenting, for each hit, an identifier specifying a location in a document the the indexes identify as including the conceptual information.

11. The method of claim 10, wherein the presenting step includes the substeps of:

receiving a request including a location-identifier for conceptual information of the stored document; and retrieving the stored document in accordance with the requested location-identifier.

12. The method of claim 1, further comprising step of:

retrieving from the databases a document identified in the indexes as including conceptual information of at least one hit.

13. The method of claim 1, further comprising step of:

retrieving from the databases a portion of a document identified in the indexes as including conceptual information of at least one hit.

14. The method of claim 1, wherein the receiving step includes the substep of:

receiving a query term and a search parameter setting user preference for text retrieval.

15. The method of claim 14, wherein the determining step includes the substep of:

computing the measure of a difference between the query and the conceptual information from one of the indexes corresponding to each hit in accordance with the search parameter.

16. An apparatus for accessing information from databases having stored indexes of conceptual information corresponding to the databases, comprising:

receiving means configured to receive a query identifying desired information;

distributing means configured to distribute the query to the indexes;

examining means configured to examine the concepts of information in the stored indexes to identify as hits the contents of the databases that match the query;

determining means configured to determine, for each hit, a measure of a difference between the query and the conceptual information from the indexes; and combining means configured to combine the hits from the indexes in accordance with the determined measures.

17. The apparatus of claim 16, wherein the combining means includes:

ranking means configured to rank the hits in accordance with the measure for each hit, the hits with lower measures indicating a better correspondence between the represented conceptual information and the query than the hits with higher measures.

18. The apparatus of claim 16, wherein the receiving means includes:

hit receiving means configured to receive a hit limit indicating a maximum number of hits.

19. The apparatus of claim 18, wherein the combining means includes:

pruning means configured to prune the hits in accordance with the hit limit.

20. The apparatus of claim 16, wherein the examining means includes:

accessing means configured to access in the indexes a stored taxonomy of concepts and relationships between the concepts.

21. The apparatus of claim 20, wherein the accessing means includes:

identifying means configured to identify concepts from the stored taxonomy that correspond to the query.

22. The apparatus of claim 20, wherein the accessing means includes:

identifying means configured to identify concepts from the stored taxonomy that correspond to the query based on the relationships among the concepts in the taxonomy.

23. The apparatus of claim 16, wherein the combining means includes:

pruning means configured to prune the hits in accordance with a predetermined hit limit.

24. The apparatus of claim 16, further comprising:

returning means configured to return the conceptual information corresponding to each hit with its difference measure.

25. The apparatus of claim 16, wherein the indexes identify documents in the databases, and wherein the apparatus further comprises:

presenting means configured to present, for each hit, an identifier specifying a location in a document that the indexes identify as including the conceptual information.

26. The apparatus of claim 16, further comprising:

retrieving means configured to retrieve from the databases a document identified in the indexes as including conceptual information of at least one hit.

27. The apparatus of claim 16, further comprising:

retrieving means configured to retrieve from the databases a portion of a document identified in the indexes as including conceptual information of at least one hit.

28. The apparatus of claim 16, wherein the presenting means includes:

receiving means configured to receive a request including a location-identifier for conceptual information of the stored document; and retrieving the stored document in accordance with the requested location-identifier.

29. The apparatus of claim 16, wherein the receiving means includes:

means configured to receive a query term and a search parameter setting user preference for text retrieval.

30. The apparatus of claim 29, wherein the determining means includes:

computing means configured to compute the measure of a difference between the query and the conceptual information from one of the indexes corresponding to each hit in accordance with the search parameter.

31. A computer program product comprising:

a computer usable medium having computer readable code embodied therein for accessing information from databases having stored indexes of conceptual information corresponding to the databases, the computer usable medium comprising:

a receiving module configured to receive a query identifying desired information;

a distribution module configured to distribute the query to the indexes;

an examining module configured to examine the concepts of information in the stored indexes to identify as hits the contents of the databases that match the query;

a determining module configured to determine, for each hit, a measure of a difference between the query and the conceptual information from the indexes; and a combining module configured to combine the hits from the indexes in accordance with the determined measures.

32. The computer usable medium of claim 31, wherein the combining module includes:

a ranking module configured to rank the hits in accordance with the measure for each hit, the hits with lower measures indicating a better correspondence between the represented conceptual information and the query than the hits with higher measures.

33. The computer usable medium of claim 31, wherein the receiving module includes:

a hit receiving module configured to receive a hit limit indicating a maximum number of hits.

34. The computer usable medium of claim 33, wherein the combining module includes:

a pruning module configured to prune the hits in accordance with the hit limit.

35. The computer usable medium of claim 31, wherein the examining module includes:

an accessing module configured to access in the indexes a stored taxonomy of concepts and relationships between the concepts.

36. The computer usable medium of claim 35, wherein the accessing module includes:

an identifying module configured to identify concepts from the stored taxonomy that correspond to the query.

37. The computer usable medium of claim 35, wherein the accessing module includes:

an identifying module configured to identify concepts from the stored taxonomy that correspond to the query based on the relationships among the concepts in the taxonomy.

38. The computer usable medium of claim 31 wherein the combining module includes:

a pruning module configured to prune the hits in accordance with a predetermined hit limit.

39. The computer usable medium of claim 31, further comprising:

a returning module configured to return the conceptual information corresponding to each hit with its difference measure.

40. The computer usable medium of claim 31, wherein the indexes identify documents in the databases, and wherein the computer usable medium further comprises:

a presenting module configured to present, for each hit, an identifier specifying a location in a document that the indexes identify as including the conceptual information.

41. The computer usable medium of claim 40, wherein the presenting module includes:

a receiving module configured to receive a request including a location-identifier for conceptual information of the stored document; and a retrieving module the stored document in accordance with the requested location-identifier.

42. The computer usable medium of claim 31, further comprising:

a retrieving module configured to retrieve from the databases a document identified in the indexes as including conceptual information of at least one hit.

43. The computer usable medium of claim 31, further comprising:

a retrieving module configured to retrieve from the databases a portion of a document identified in the indexes as including conceptual information of at least one hit.

44. The computer usable medium of claim 31, wherein the receiving module includes:

a module configured to receive a query term and a search parameter setting user preference for text retrieval.

45. The computer usable medium of claim 44, wherein the determining module includes:

a computing module configured to compute the measure of a difference between the query and the conceptual information from one of the indexes corresponding to each hit in accordance with the search parameter.

46. A method for accessing information from databases having stored indexes of conceptual information corresponding to the databases in a distributed processing system having a plurality of platforms, the method comprising the steps, performed by a processor, of:

receiving a query identifying desired information;

distributing the query to the indexes;

identifying information corresponding to the query from the stored indexes distributed among the plurality of platforms; and determining a measure of a difference between the query and the identified information.

47. The method of claim 46 further comprising the step of:

combining the identified information from each index in accordance with the corresponding measure.

48. The method of claim 47, wherein the combining step includes the substep of:

ranking the identified information from all of the indexes, with the information having lower measures indicating a better correspondence between that information and the query than the information with higher measures.

49. An apparatus for accessing information from databases having stored indexes of conceptual information corresponding to the databases in a distributed processing system having a plurality of platforms, comprising:

receiving means configured to receive a query identifying desired information;

distributing means configured to distribute the query to the indexes;

identifying means configured to identify information corresponding to the query from the stored indexes distributed among the plurality of platforms; and determining means configured to determine a measure of a difference between the query and the identified information.

50. The apparatus of claim 49 further comprising:

combining means configured to combine the identified information from each index in accordance with the corresponding measure.

51. The apparatus of claim 50, wherein the combining means includes:

ranking means configured to rank the identified information from all of the indexes, with the information having lower measures indicating a better correspondence between that information and the query than the information with higher measures.

52. A computer program product comprising:

a computer usable medium having computer readable code embodied therein for accessing information from databases having stored indexes of conceptual information corresponding to the databases in a distributed processing system having a plurality of platforms, the computer usable medium comprising:

a receiving module configured to receive a query identifying desired information;

a distributing module configured to distribute the query to the indexes;

an identifying module configured to identify information corresponding to the query from the stored indexes distributed among the plurality of platforms; and determining means configured to determine a measure of a difference between the query and the identified information.

53. The computer usable medium of claim 52 further comprising:

a combining module configured to combine the identified information from each index in accordance with the corresponding measure.

54. The computer usable medium of claim 53, wherein the combining module includes:

a ranking module configured to rank the identified information from all of the indexes, with the information having lower measures indicating a better correspondence between that information and the query than the information with higher measures.

55. A method for accessing information from databases having stored indexes of conceptual information corresponding to the databases in a processing system having a plurality of platforms, the method comprising the steps, performed by a processor, of:

receiving a query identifying desired information;

distributing the query to the indexes;

identifying information corresponding to the query from the stored indexes distributed among the plurality of processes; and determining a measure of a difference between the query and the identified information.

56. The method of claim 55 further comprising the step of:

combining the identified information from each index in accordance with the corresponding measure.

57. The method of claim 56, wherein the combining step includes the substep of:

ranking the identified information from all of the indexes with the information having lower measures indicating a better correspondence between that information and the query than the information with higher measures.

58. An apparatus for accessing information from databases having stored indexes of conceptual information corresponding to the databases in a processing system having a plurality of platforms, comprising:

receiving means configured to receive a query identifying desired information;

distributing means configured to distribute the query to the indexes;

identifying means configured to identify information corresponding to the query from the stored indexes distributed among the plurality of processes; and determining means configured to determine a measure of a difference between the query and the identified information.

59. The apparatus of claim 58 further comprising:

combining means configured to combine the identified information from each index in accordance with the corresponding measure.

60. The apparatus of claim 59, wherein the combining means includes:

ranking means configured to rank the identified information from all of the indexes with the information having lower measures indicating a better correspondence between that information and the query than the information with higher measures.

61. A computer program product comprising:

a computer usable medium having computer readable code embodied therein for accessing information from databases having stored indexes of conceptual information corresponding to the databases in a processing system having a plurality of platforms, the computer usable medium comprising:

a receiving module configured to receive a query identifying desired information;

a distributing module configured to distribute the query to the indexes;

an identifying module configured to identify information corresponding to the query from the stored indexes distributed among the plurality of processes; and a determining module configured to determine a measure of a difference between the query and the identified information.

62. The computer usable medium of claim 61 further comprising:

a combining module configured to combine the identified information from each index in accordance with the corresponding measure.

63. The computer usable medium of claim 62, wherein the combining module includes:

a ranking module configured to rank the identified information from all of the indexes with the information having lower measures indicating a better correspondence between that information and the query than the information with higher measures.

* * * * *

UNITED STATES PATENT AND TRADEMARK OFFICE
CERTIFICATE OF CORRECTION

PATENT NO.: 6,101,491
DATED: August 8, 2000
INVENTOR: William A. WOODS

It is certified that an error appears in the above-identified patent and that said Letters Patent is hereby corrected as shown below:

Claim 12, col. 11, line 36, delete "stcp" and insert --the step--; and

Claim 13, col. 11, line 40, delete "step" and insert --the step--.

Signed and Sealed this

Seventeenth Day of April, 2001

Attest:

NICHOLAS P. GODICI

Attesting Officer

Acting Director of the United States Patent and Trademark Office